United States Patent
Kodama

[19]

[11] Patent Number: 6,124,843

[45] Date of Patent: Sep. 26, 2000

[54] HEAD MOUNTING TYPE IMAGE DISPLAY SYSTEM

[75] Inventor: Hiroshi Kodama, Hachioji, Japan

[73] Assignee: Olympus Optical Co., Ltd., Tokyo, Japan

[21] Appl. No.: 08/591,100

[22] Filed: Jan. 25, 1996

[30] Foreign Application Priority Data

Jan. 30, 1995 [JP] Japan .................................. 7-012258

[51] Int. Cl.$^7$ ...................................................... G09G 5/08
[52] U.S. Cl. ............................... 345/145; 345/157; 345/8
[58] Field of Search .................................. 345/156, 157, 345/145, 121, 123, 7, 8, 341

[56] References Cited

U.S. PATENT DOCUMENTS

| | | |
|---|---|---|
| 5,313,229 | 5/1994 | Gilligan et al. . |
| 5,374,942 | 12/1994 | Gilligan et al. . |
| 5,864,330 | 1/1999 | Haynes ..................................... 345/123 |

FOREIGN PATENT DOCUMENTS

| | | |
|---|---|---|
| 4168489 | 6/1992 | Japan . |
| 541822 | 2/1993 | Japan . |
| 5241767 | 9/1993 | Japan . |

*Primary Examiner*—Kent Chang
*Attorney, Agent, or Firm*—Laff, Whitesel & Saret, Ltd.; J. Warren Whitesel

[57] ABSTRACT

Mounted on the head of an observer, an image display element has an eyepiece optical system which guides the displayed image onto the eyeballs of an observer. An input position indication mark is displayed on the image. An image converter transmits an image signal to the image display element with the relative positional relationship between the image and the position indication mark changed. The converted image signal forms the input position indication mark so that it is movable within a range which has a radius of ¼ or less of a diagonal line length extending from the intersection between the diagonal lines of the display surface. The image scrolls as a background image with respect to the position indication mark.

14 Claims, 7 Drawing Sheets

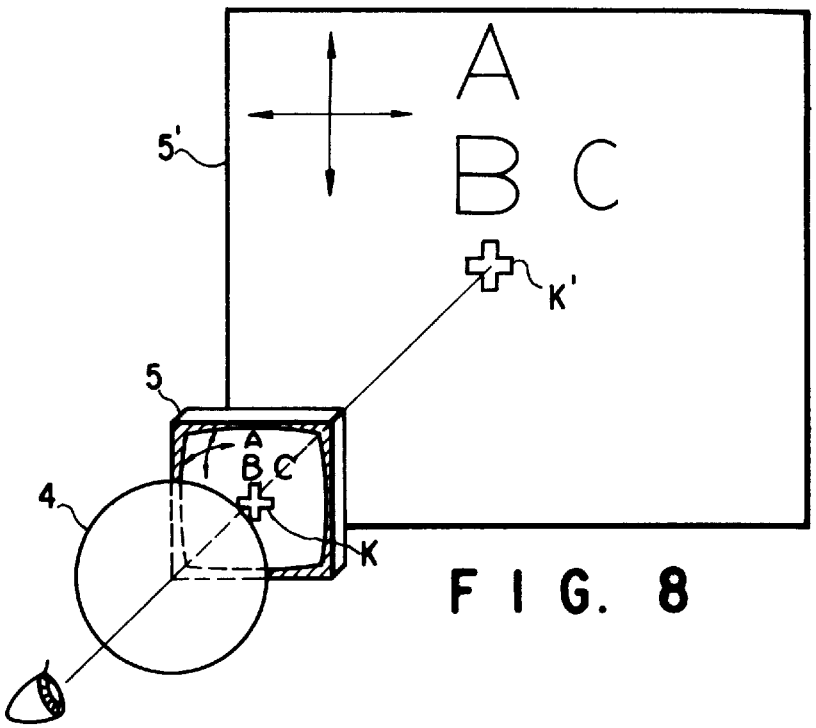
FIG. 8
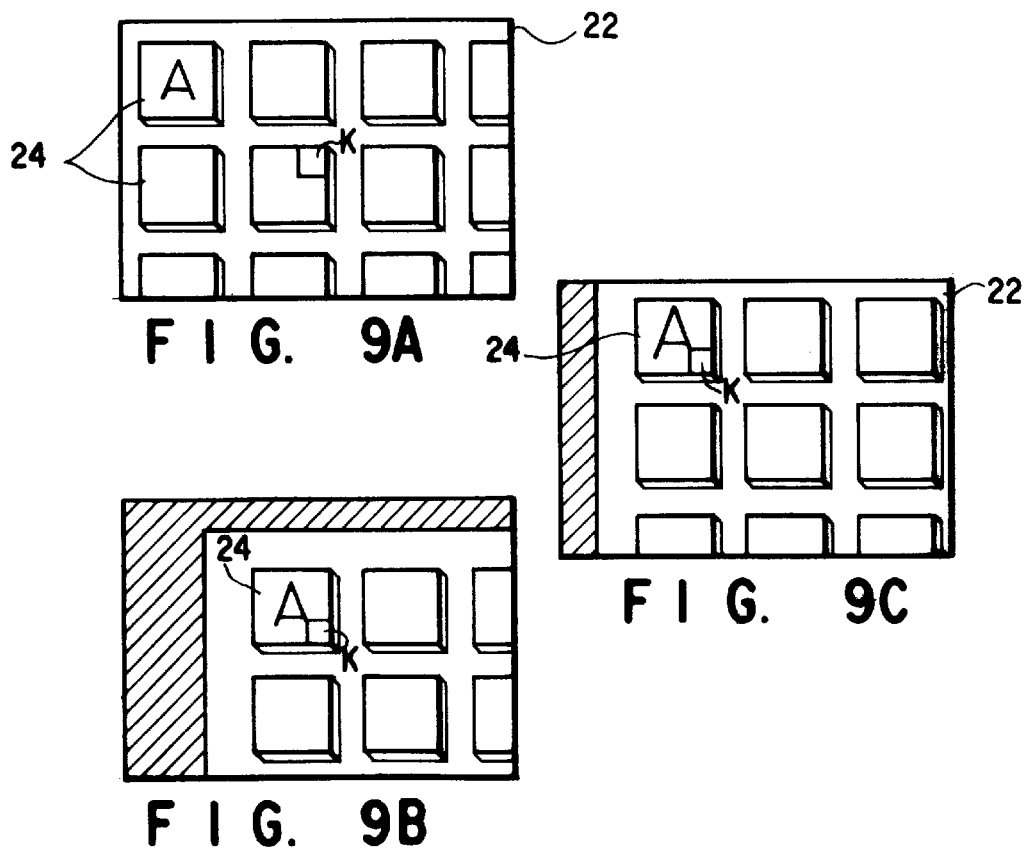
FIG. 9A
FIG. 9B
FIG. 9C

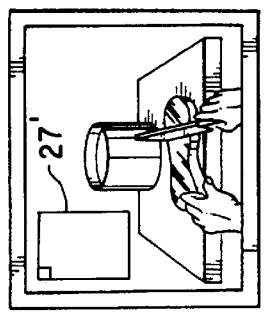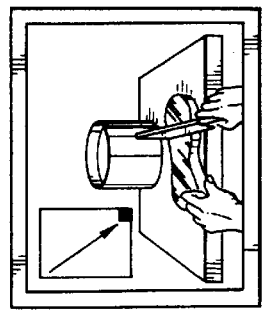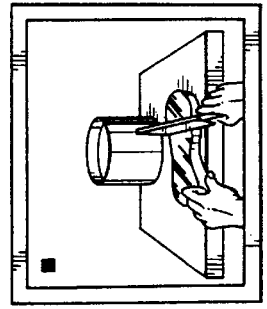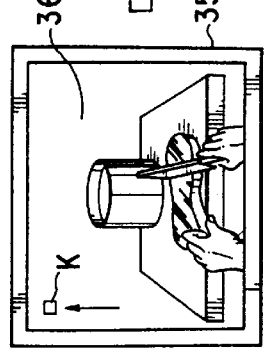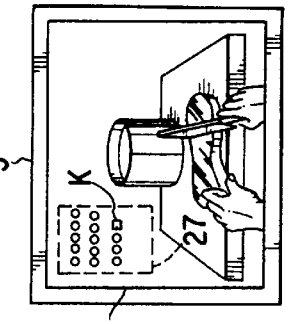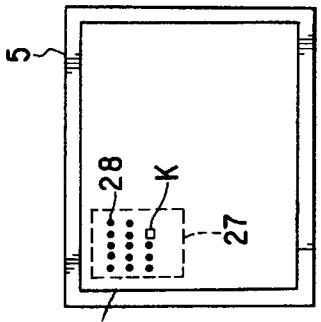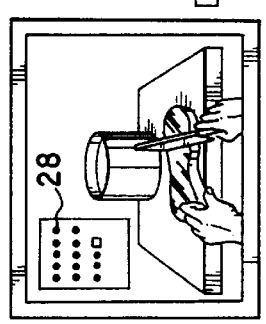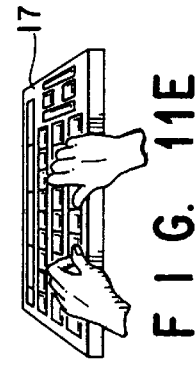

HEAD MOUNTING TYPE IMAGE DISPLAY SYSTEM

BACKGROUND OF THE INVENTION

1. Field of the Invention

The present invention generally relates to a head mounting type image display system and, more particularly, to a head mounting type image display system which is mounted on the head portion of an observer and can project an image onto the corneas of the observer's eyeballs.

2. Description of the Related Art

Conventionally, an apparatus such as a wordprocessor, a personal computer, or the like, which allows to input characters, symbols, and the like at the position of an input position indication mark (normally, a cursor) using a keyboard and displays the input characters, symbols, and the like on the screen, or moves the input position indication mark (cursor) by operating a cursor mover such as a mouse, cursor keys, a return key, a joystick, a tracing ball, a light pen, or the like on the screen, and allows an input instruction or the like at the position of the moved cursor, is known.

Needless to say, products using these techniques are widely commercially available from various manufacturers such as Fujitsu, Toshiba, Hitachi, NEC, Apple, IBM, and the like, and such techniques are generally well known.

On the other hand, a head mounting type image display system which is mounted on the head portion of an observer, displays an image using an image display element such as a liquid crystal display element (LCD) or the like, and guides, as a virtual image, the displayed image to the eyeballs of the observer using various eyepiece optical systems such as a lens system, a concave mirror, and the like, is known.

The head mounting type image display system is a new type image display system which can be mounted on the head portion of the observer via mounting means without being held by, e.g., the operator's hand, and allows the observer to observe a large-scale image using a compact image display element arrangement therein.

Proposals as combinations of the wordprocessor or personal computer and the head mounting type image display system have been proposed.

To the knowledge of the present applicant, Jpn. Pat. Appln. KOKAI Publication Nos. 3-289615 (prior art 1), 4-22920 (prior art 2), 4-168489 (prior art 3), 5-41822 (prior art 4), 5-241767 (prior art 5), 5-250089 (prior art 6), 6-72186 (prior art 7), and 6-78247 (prior art 8) are available.

Of these prior arts, prior arts 2 and 3 disclose techniques as simple combinations of the wordprocessor or personal computer and the head mounting type image display system.

Prior arts 1, 5, 6, and 7 disclose techniques for detecting the displacement of the head portion of an observer, and moving a cursor or keyboard on the screen in accordance with the detection result.

Prior art 4 discloses a technique for detecting the visual line or line of sight of an observer, and moving the cursor on the screen in accordance with the detection result.

Prior art 8 discloses a technique for detecting the tilt, in the vertical direction, of the head, and scrolling the entire screen vertically in accordance with the detection result.

However, all of these prior arts pose a common problem when the cursor is moved to the end of the screen, and an input operation is performed.

In the operation of a normal (not a head mounting type) wordprocessor or personal computer, since the screen for displaying an image is independent from the head portion of the observer, when the cursor is moved to the end (e.g., an icon portion or the beginning of a sentence at the end of the screen) using, e.g., a mouse, and a click or key input operation is performed there, the observer can always observe the cursor in front of his or her face by turning his or her face in the display direction of the cursor in accordance with the movement of the cursor.

However, in the head mounting type image display system, since the image display element for displaying an image is integrated with the head portion of the observer, even when the observer turns his or her faces to follow the cursor, the entire image moves to follow the movement of the face. As a result, the cursor falls outside the field of view of the observer.

For this reason, since the observer cannot observe the cursor in front of his or her face by turning his or her face, he or she must follow the cursor by moving only his or her eyeballs in the vertical and horizontal directions while fixing his or her face in position.

Therefore, in the conventional system, since the observer performs an input operation while repetitively moving his or her eyeballs in the vertical and horizontal directions, or performs an operation while turning his or her eyes greatly in one direction, eye fatigue is considerable, and the observer cannot use such a system for a long period of time.

SUMMARY OF THE INVENTION

It is, therefore, an object of the present invention to provide a new and improved head mounting type image display system, which can reduce eye fatigue even in an input operation by an observer.

According to a first aspect of the present invention, there is provided a head mounting type image display system comprising: a head mounting type image display system main body having an image display element for displaying an image, an eyepiece optical system for guiding the image displayed on the image display element to an eyeball of an observer, and mounting means for allowing the image display element and the eyepiece optical system to be mounted on a head portion of the observer; an operation device for displaying an input position indication mark on the image, and operating the input position indication mark; and image conversion means for transmitting, to the image display element, an image signal in which a relative positional relationship between the image and the input position indication mark displayed on a display surface of the image display element has changed upon operation of the operation device, wherein the image signal converted by the image conversion means has a function of forming the input position indication mark to be movable within a circular range which has a radius not more than ¼ a diagonal line length from an intersection of diagonal lines of the display surface and a function of scrolling the image as a background image with respect to the input position indication mark, both upon operation of the operation device.

According to the above-mentioned first aspect of the present invention, an image displayed on the image display element is enlarged by the eyepiece optical system, and is projected onto the eyeballs of the observer as a virtual image. The virtual image serves as a virtual monitor for the observer. Since the image display element and the eyepiece optical system are fixed to the observer via the mounting means, the virtual monitor is also integrated with the observer. On the virtual monitor, images such as ruled lines, scale marks, icon portions, and the like, and the input position indication mark (generally, a cursor), which is displaced relative to these images, are displayed. When the observer operates the operation unit, the position of the input position indication mark can be adjusted by the image conversion means to the position on an image that the observer intended in correspondence with the operation. In this case, since the image signal converted by the image conversion means is an image signal which locates the input position indication mark at the central portion of the display surface and scrolls images, the input position indication mark is always displayed in front of the face of the observer independently of the position to which the input position indication mark is guided. The central portion of the display surface means a range which has the intersection of the diagonal lines of the display surface as the center and is defined by a length ¼ the diagonal line length, and when the input position indication mark falls within this range, eye fatigue due to pivotal motions of the eyeballs can be suppressed. For this reason, the observer can gaze the input position indication marks without turning the eyeballs in the vertical and horizontal directions even in a long-time input operation, thus lessening fatigue of the eyes of the observer.

According to a second aspect of the present invention, there is provided a head mounting type image display system comprising: a head mounting type image display system main body having an image display element for displaying an image, an eyepiece optical system for guiding the image displayed on the image display element to an eyeball of an observer, and mounting means for allowing the image display element and the eyepiece optical system to be mounted on a head portion of the observer; an operation device for displaying an input position indication mark on the image, and operating the input position indication mark; and image conversion means for transmitting, to the image display element, an image signal in which a relative positional relationship between the image and the input position indication mark displayed on a display surface of the image display element has changed upon operation of the operation device, wherein the image signal converted by the image conversion means has a function of forming the input position indication mark to be fixed in position within a circular range which has a radius not more than ¼ a diagonal line length from an intersection of diagonal lines of the display surface and a function of scrolling the image as a background image with respect to the input position indication mark, both upon operation of the operation device.

According to the second aspect, an image displayed on the image display element is enlarged by the eyepiece optical system, and is projected onto the eyeballs of the observer as a virtual image. The virtual image serves as a virtual monitor for the observer. Since the image display element and the eyepiece optical system are fixed to the observer via the mounting means, the virtual monitor is also integrated with the observer. On the virtual monitor, images such as ruled lines, scale marks, icon portions, and the like, and the input position indication mark (generally, a cursor), which is displaced relative to these images, are displayed. When the observer operates the operation unit, the position of the input position indication mark can be adjusted by the image conversion means to the position on an image that the observer intended in correspondence with the operation. In this case, since the image signal converted by the image conversion means is an image signal which locates the input position indication mark at the central portion of the display surface and scrolls images, the input position indication mark is always displayed in front of the face of the observer independently of the position to which the input position indication mark is guided. The central portion of the display surface means a range which has the intersection of the diagonal lines of the display surface as the center and is defined by a length ¼ the diagonal line length, and it suffices if the input position indication mark falls within this range. For this reason, the operator can gaze the input position indication marks without turning the eyeballs in the vertical and horizontal directions even in a long-time input operation, and eye fatigue due to pivotal motions of the eyes of the observer can be eliminated.

According to a third aspect of the present invention, there is provided a head mounting type image display system comprising: a head mounting type image display system main body having an image display element for displaying an image, an eyepiece optical system for guiding the image displayed on the image display element to an eyeball of an observer, and mounting means for allowing the image display element and the eyepiece optical system to be mounted on a head portion of the observer; an operation device for displaying an input position indication mark on the image, and operating the input position indication mark; and image conversion means for transmitting, to the image display element, an image signal in which a relative positional relationship between the image and the input position indication mark displayed on a display surface of the image display element has changed upon operation of the operation device, wherein the operation device comprises: input position indication mark moving means for moving a display position of the input position indication mark with respect to the display surface in correspondence with an operation of the observer; and input position indication mark fixing means for fixing the input position indication mark at the display position of the input position indication mark which is changed by the input position indication mark moving means, and the image signal converted by the image conversion means has a function of forming the input position indication mark to be fixed in position within a circular range which has a radius not more than ¼ a diagonal line length from the changed display position and a function of scrolling the image as a background image with respect to the input position indication mark, both upon operation of the operation device.

According to the third aspect, an image displayed on the image display element is enlarged by the eyepiece optical system, and is projected onto the eyeballs of the observer as a virtual image. The virtual image serves as a virtual monitor for the observer. Since the image display element and the eyepiece optical system are fixed to the observer via the mounting means, the virtual monitor is also integrated with the observer. On the virtual monitor, images such as ruled lines, scale marks, icon portions, and the like, and the input position indication mark (generally, a cursor), which is displaced relative to these images, are displayed. When the observer operates the operation unit, the position of the input position indication mark can be adjusted by the image conversion means to the position on an image that the observer intended in correspondence with the operation. In this case, since the image signal converted by the image conversion means is an image signal which locates the input position indication mark at a position in the vicinity of a desired position on the display surface and scrolls images, the input position indication mark is always displayed at a desired position of the observer independently of the position to which the input position indication mark is guided. A method of determining a desired position of the observer will be described below. The operator operates the input position indication mark moving means to move the display position of the input position indication mark with respect to the display surface, which is always fixed in position with respect to the observer, to a desired easy-to-see position of the observer, and the position of the input position indication mark can be fixed at the desired easy-to-see position or set at a position in the vicinity of the easy-to-see position by the input position indication mark fixing means. For example, since an observer whose right eye is more effective than the left eye is easy to see the mark which is slightly offset from the center of the display surface to the right side, he or she can adjust the position of the mark to the easy-to-see position. Since images are scrolled upon operation of the operation device while locating the mark within the range which has the adjusted position as the center and is defined by a distance ¼ or less the diagonal line length of the display surface, the cursor is easy to observe. For this reason, the observer can gaze the input position indication mark without turning the eyeballs in the vertical and horizontal directions even in a long-time input operation, thus reducing fatigue of the eyes of the observer.

According to a fourth aspect of the present invention, there is provided a head mounting type image display system comprising: a head mounting type image display system main body having an image display element for displaying an image, an eyepiece optical system for guiding the image displayed on the image display element to an eyeball of an observer, and mounting means for allowing the image display element and the eyepiece optical system to be mounted on a head portion of the observer; an operation device for displaying an input position indication mark on the image, and operating the input position indication mark; and image conversion means for transmitting, to the image display element, an image signal in which a relative positional relationship between the image and the input position indication mark displayed on a display surface of the image display element has changed upon operation of the operation device, wherein the input position indication mark is arranged on the display surface or a transparent substrate arranged in the vicinity of the display surface, and is located within a circular range which has a radius not more than ¼ a diagonal line length from an intersection of the diagonal lines of the display surface, and the image signal converted by the image conversion means has a function of scrolling the image as a background image in correspondence with the input position indication mark upon operation of the operation device.

According to the fourth aspect, an image displayed on the image display element is enlarged by the eyepiece optical system, and is projected onto the eyeballs of the observer as a virtual image. The virtual image serves as a virtual monitor for the observer. Since the image display element and the eyepiece optical system are fixed to the observer via the mounting means, the virtual monitor is also integrated with the observer. On the virtual monitor, images such as ruled lines, scale marks, icon portions, and the like are displayed. On the other hand, the transparent substrate provided with the input position indication mark is arranged on or in the vicinity of the display surface for displaying the images. When the observer operates the operation unit, the image conversion means scrolls the images in correspondence with the operation, and the position of the input position indication mark can be adjusted to the position on an image that the observer intended. Since the input position indication mark falls within the range which has the intersection of the diagonal lines of the display surface as the center and is defined by a length ¼ the diagonal line length, the mark is always presented in front of the face of the observer. For this reason, the observer can gaze the input position indication mark without turning the eyeballs in the vertical and horizontal directions even in a long-time input operation, thus reducing fatigue of the eyes of the observer. In addition, as compared to the arrangement for displaying the input position indication mark on the display screen on the basis of a signal, the image processing mechanism can be simplified, thus attaining size and cost reductions.

According to a fifth aspect of the present invention, there is provided a head mounting type image display system comprising: a head mounting type image display system main body having an image display element for displaying an image, an eyepiece optical system for guiding the image displayed on the image display element to an eyeball of an observer, and mounting means for allowing the image display element and the eyepiece optical system to be mounted on a head portion of the observer; an operation device for displaying an input position indication mark on the image, and operating the input position indication mark; and image conversion means for transmitting, to the image display element, an image signal in which a relative positional relationship between the image and the input position indication mark displayed on a display surface of the image display element has changed upon operation of the operation device, wherein the image signal converted by the image conversion means is an image signal for moving the input position indication mark on the display surface and scrolling the image as a background image in a direction opposite to the moving direction of the input position indication mark with respect to the input position indication mark, both upon operation of the operation device.

According to the fifth aspect, an image displayed on the image display element is enlarged by the eyepiece optical system, and is projected onto the eyeballs of the observer as a virtual image. The virtual image serves as a virtual monitor for the observer. Since the image display element and the eyepiece optical system are fixed to the observer via the mounting means, the virtual monitor is also integrated with the observer. On the virtual monitor, images such as ruled lines, scale marks, icon portions, and the like, and the input position indication mark (generally, a cursor), which is displaced relative to these images, are displayed. When the observer operates the operation unit, the position of the input position indication mark can be adjusted by the image conversion means to the position on an image that the observer intended in correspondence with the operation. In this case, since the image signal converted by the image conversion means is an image signal which moves the position indication mark on the display surface upon operation of the operation device and scrolls images in a direction opposite to the moving direction of the input position indication mark, the moving amount of the indication mark on the display surface becomes smaller than that on images when the input position indication mark is guided to a desired position on an image. For this reason, the observer can gaze the input position indication mark without turning the eyeballs in the vertical and horizontal directions even in a long-time input operation, thus lessening fatigue of the eyes of the observer. In addition, the moving amount of images with respect to the display surface can become smaller than that of the arrangement of claims of the present specification in which the cursor position is substantially fixed, the display surface can be effectively used even on the edge portion of an image.

According to a sixth aspect of the present invention, there is provided a head mounting type image display system according to any one of the first to fifth aspects, wherein the operation device comprises a face direction detector which is arranged integrally with the head mounting type image display system main body, and can detect a displacement of a direction of a face of the observer, and the image signal converted by the image conversion means has a function of scrolling the image as a background image with respect to the input position indication mark so as to scroll the image in a direction opposite to the direction of the displacement of the direction of the face detected by the face direction detector, both upon detection of the displacement of the direction of the face by the face direction detector.

Furthermore, according to the sixth aspect, the displacement of the direction of the face of the observer is detected by the face direction detector, and the image conversion means can convert the image signal into a signal which moves the virtual image in a direction opposite to the displacement direction of the face while locating the input position indication mark at the central portion of the virtual screen or a predetermined position desired by the observer. For this reason, when the observer turns his or her face in a direction to move the input position indication mark, the input position indication mark moves in that direction, while the virtual image does not move. For this reason, the observer can perform an operation as if he or she were moving the input position indication mark in the turning direction of his or her face on the virtual screen independent from himself or herself, resulting in an easy operation.

According to a seventh aspect of the present invention, there is provided a head mounting type image display system according to any one of the first to fifth aspects, wherein the operation device is arranged independently of the head mounting type image display system main body.

According to the seventh aspect, since the operation device can be constituted as an independent unit which is connected to the head mounting type image display system main body via only radio waves or a wiring line, it can be operated by the observer's hand, and a weight reduction of the head mounting type image display system main body can be attained, thus reducing the weight load on the observer.

According to an eighth aspect of the present invention, there is provided a head mounting type image display system according to the seventh aspect, wherein the operation device comprises a keyboard, and the image signal converted by the image conversion means is an image signal for scrolling the image to a left side in cooperation with an input operation at the keyboard.

According to the eighth embodiment, since the virtual image is scrolled to the left in cooperation with the input operation of the keyboard while the input position indication mark is always located at the central portion of the virtual screen, the observer can perform, e.g., creation of an input document in front of his or her eyes without turning his or her eyeballs in the vertical and horizontal directions.

According to a ninth aspect of the present invention, there is provided a head mounting type image display system according to the seventh aspect, wherein the operation device comprises an input position conversion operation device which can instruct a two-dimensional conversion of the relative positional relationship of the image and the input position indication mark displayed on the display surface of the image display element, and the image signal converted by the image conversion means is an image signal for scrolling the image in correspondence with an operation direction and/or a position of the input position conversion operation device.

According to the ninth embodiment, since the virtual image is scrolled in correspondence with the operation direction and/or the operation position of the input position conversion operation device such as a mouse, cursor keys, return key, joystick, tracing ball, light pen, or the like while the input position indication mark is always located at the central portion of the virtual screen or a predetermined position desired by the observer, the observer can always gaze the input position indication mark in front of his or her eyeballs without turning his or her eyeballs in the vertical and horizontal directions even in a two-dimensional operation using the input position conversion operation device.

Furthermore, when the image signal converted by the image conversion means is set to be an image signal which scrolls the images to scroll the virtual image in a direction opposite to the operation direction of the input position conversion operation device in correspondence with the operation direction of the input position conversion operation device, the observer can perform an operation as if he or she were moving the input position indication mark in the operation direction with respect to the virtual image.

Moreover, when the image signal converted by the image conversion means is set to be an image signal which scrolls the images to scroll the virtual image in the same direction as the operation direction of the input position conversion operation device in correspondence with the operation direction of the input position conversion operation device, the observer can perform an operation as if he or she were moving the virtual image in the operation direction with respect to the input position indication mark. This arrangement is expected to allow the observer to perform a natural operation in practice.

According to a tenth aspect of the present invention, there is provided a head mounting type image display system according to the ninth aspect, wherein the input position conversion operation device comprises a mouse, and the image signal converted by the image conversion means is an image signal for scrolling the image in correspondence with an operation direction of the mouse.

According to the tenth aspect, the virtual image is scrolled in the same direction as the operation direction of the mouse in correspondence with the operation direction of the mouse, while the input position indication mark is always located at the central portion of the virtual screen or a predetermined position desired by the observer. For this reason, the observer can perform an operation as if he or she were moving the virtual image itself in the vertical and horizontal directions with respect to the input position indication mark, which is substantially fixed in position with respect to the observer himself or herself, by holding the mouse, resulting in an easy operation.

According to an eleventh aspect of the present invention, there is provided a head mounting type image display system according to any one of the first to tenth aspects, wherein the head mounting type image display system main body further has a window which allows the observer to visually confirm an external field.

According to the eleventh aspect, since the observer can observe the outer field via the window, he or she can virtually confirm the operation of the operation device or an input instruction operation at his or her hand, thus allowing an easy operation.

According to a twelfth aspect of the present invention, there is provided a head mounting type image display system according to any one of the first to eleventh aspects, wherein a pixel density in the vicinity of the input position indication mark on a virtual image is higher than a pixel density at an end portion of the image.

According to the twelfth aspect, the head mounting type image display system is limited in using a large-scale multi-pixel image display element since the image display element is mounted on the head portion. However, since pixels are concentrated on a portion in the vicinity of the input position indication mark which is most frequently gazed by the observer, an image in the vicinity of the input position indication mark can have a high resolution independently of the operation of the operation unit. For this reason, the gazing portion can always have a high resolution while the number of pixels is limited, resulting in an easy operation and observation.

According to a thirteenth aspect of the present invention, there is provided a head mounting type image display system according to the fifth aspect, wherein the image signal converted by the image conversion means locates the input position indication mark within a range separated by a distance not more than ¼ a diagonal line length from an intersection between diagonal lines of the display surface upon operation of the operation device.

According to the thirteenth aspect, the image signal converted by the image conversion means can locate the input position indication mark at a position falling within a range separated by a distance ¼ or less the diagonal line length from the intersection of the diagonal lines of the display screen upon operation of the operation device. Therefore, since the indication mark is always located in front of the observer, the observer can observe the indication mark at a desired position on an image without largely moving his or her eyeballs in the vertical and horizontal directions.

According to a fourteenth aspect of the present invention, there is provided a head mounting type image display system comprising: a head mounting type image display system main body having an image display element for displaying an image, an eyepiece optical system for guiding the image displayed on the image display element to an eyeball of an observer, and mounting means for allowing the image display element and the eyepiece optical system to be mounted on a head portion of the observer; an operation device for displaying an input position indication mark on the image, and operating the input position indication mark; and image conversion means for transmitting, to the image display element, an image signal in which a relative positional relationship between the image and the input position indication mark displayed on a display surface of the image display element has changed upon operation of the operation device, wherein the system has a function of selecting a desired region on the display surface of the image display element upon movement of the operation device, and displaying the image on only the selected desired region.

According to the fourteenth aspect, information can be displayed at a position that does not disturb observation.

According to a fifteenth aspect of the present invention, there is provided a head mounting type image display system comprising: a head mounting type image display system main body having an image display element for displaying an image, an eyepiece optical system for guiding the image displayed on the image display element to an eyeball of an observer, and mounting means for allowing the image display element and the eyepiece optical system to be mounted on a head portion of the observer; an operation device for displaying an input position indication mark on the image, and operating the input position indication mark; and image conversion means for transmitting, to the image display element, an image signal in which a relative positional relationship between the image and the input position indication mark displayed on a display surface of the image display element has changed upon operation of the operation device, wherein the system has a function of selecting a desired region on the display surface of the image display element upon movement of the operation device, and displaying an image different from the image on only the selected desired region.

According to the fifteenth aspect, information can be presented at a position that does not disturb observation of an image or to be superposed on the image.

According to a sixteenth aspect of the present invention, there is provided a head mounting type image display system according to the fourteenth or fifteenth aspect, wherein the system further comprises a second image display element, arranged to be separated from the head mounting type image display system main body, the second image display element displaying the image and the input position indication mark displayed on the display surface of the image display element.

According to the sixteenth aspect, a third party can transmit data by setting a region which is easy to observe by the observer.

According to a seventeenth aspect of the present invention, there is provided a head mounting type image display system according to the fourteenth aspect, wherein the head mounting type image display system main body further has a window which allows the observer to visually confirm an external field.

According to the seventeenth aspect, the observer can perform an operation while observing the outer field.

According to an eighteenth aspect of the present invention, there is provided a head mounting type image display system according to the seventeenth aspect, wherein the window which allows the observer to visually confirm the external field constitutes a portion of the eyepiece optical system, and allows the observer to simultaneously visually confirm the external field and the image which are superposed on each other.

According to the eighteenth aspect, image data can be displayed to be superposed on the outer field observed by the observer.

According to a nineteenth aspect of the present invention, there is provided a head mounting type image display system according to the fifteenth aspect, wherein the head mounting type image display system main body further has a fixed photographing camera which can photograph an image in front of the observer, and the system further comprises transmission means for transmitting the photographed image to the display surface of the image display element.

According to the nineteenth aspect, the observer can observe an image photographed by the camera.

According to a twentieth aspect of the present invention, there is provided a head mounting type image display system according to the sixteenth aspect, wherein the head mounting type image display system main body further has a fixed photographing camera which can photograph an image in front of the observer, and the system further comprises transmission means for transmitting the photographed image to a display surface of the second image display element.

According to the twentieth aspect, a third party can determine the image range to be displayed on the basis of an image photographed by the camera.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 8 is a view showing an example wherein pixels, in the vicinity of the cursor, of a virtual image are set at a high density;

FIGS. 9A, 9B, and 9C are views showing an example wherein an image and the cursor are moved in nearly opposite directions; and FIG. 10 and FIGS. 11A to 11G and FIG. 12 are views respectively showing the arrangement and operation of a head mounting type image display system according to the third embodiment of the present invention.

DETAILED DESCRIPTION OF THE PREFERRED EMBODIMENTS

Figure 1A:
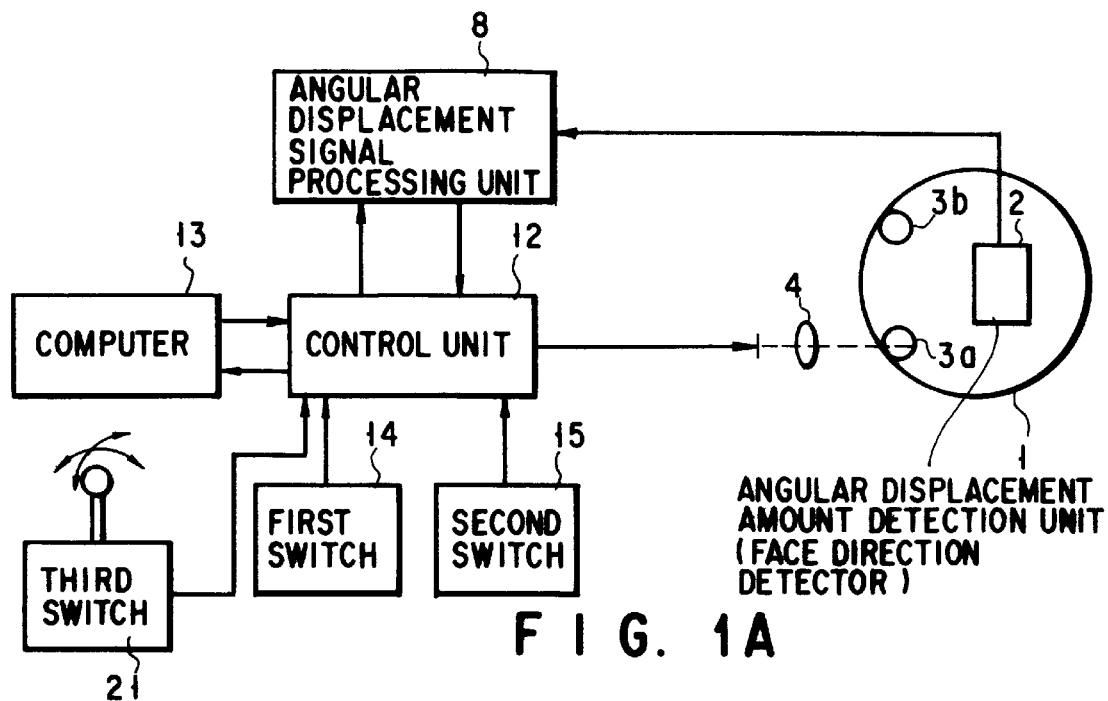
FIGS. 1A and 1B are schematic views showing the first embodiment of the present invention.

Reference will now be made in detail to the presently preferred embodiments of the invention as illustrated in the accompanying drawings, in which like reference characters designate like or corresponding parts throughout the several drawings.

The first embodiment of the present invention will be described hereinafter with reference to FIGS. 1A and 1B, and FIGS. 2 and 3.

Figure 1B:
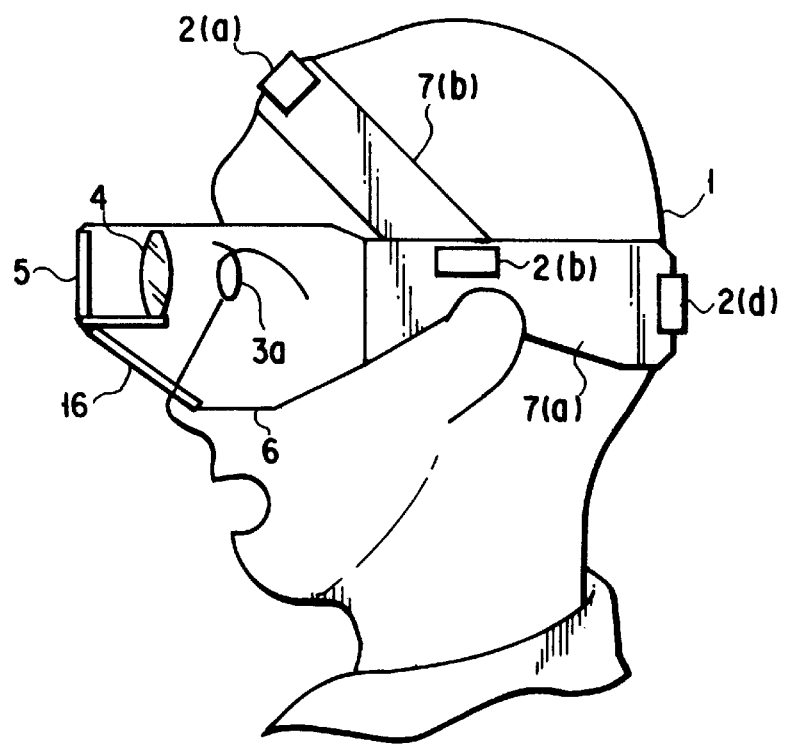
Figure 2:
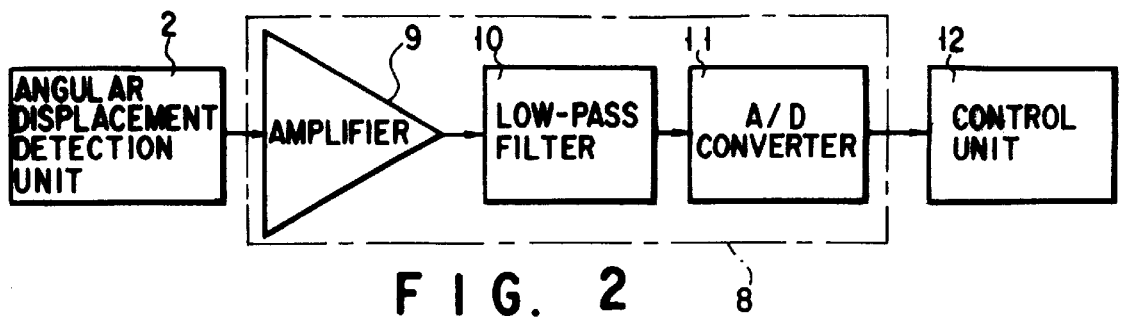
FIG. 2 is a block diagram showing the arrangement of an angular displacement signal processing unit shown in FIG. 1A.
Figure 3:
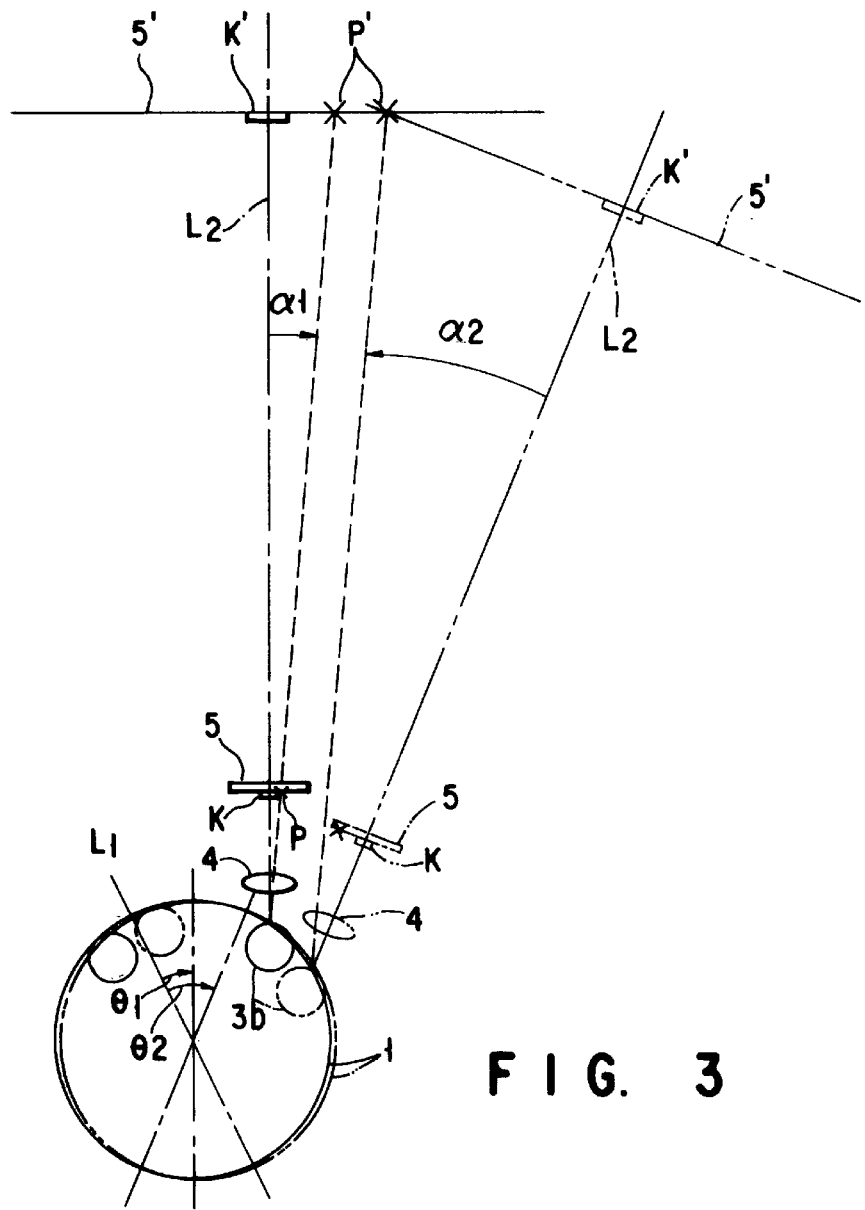
FIG. 3 is a view showing the positional relationship among the angular displacement amount of the head portion, images on an actual display surface and an aerial image, and the cursor position upon back-and-forth movement of the head portion.

FIGS. 1A and 1B are schematic views showing the first embodiment of the present invention, FIG. 2 is a diagram showing the arrangement of an angular displacement signal processing unit, and FIG. 3 is a view showing the relationship among the angular displacement of the head portion, a display screen, and a change in azimuth angle of a cursor.

FIG. 1A is a schematic diagram of the present invention, and FIG. 1B is a view showing the layout of an image display element and an eyepiece optical system when an observer wears a head mounting type image display system.

Referring to FIGS. 1A and 1B, an angular displacement amount detection unit (face direction detector) 2 for detecting the pivot angle, i.e., the angular displacement when the observer turns his or her head portion 1 in the vertical and horizontal directions is attached and fixed to the head portion 1 of the observer. The unit 2 outputs an electrical signal in correspondence with a change in direction of the head portion 1. The angular displacement amount detection unit 2 comprises, e.g., a piezoelectric vibration type gyro.

An image display element (e.g., an LCD) 5 is arranged in front of a left eyeball 3a of the user via an eyepiece lens 4. The eyepiece lens 4 enlarges an image displayed on the image display element 5, and projects a virtual image at an easy-to-observe position of the observer.

Although not shown, an image display element 5 and an eyepiece lens 4 are also arranged in front of a right eyeball 3b of the user.

As shown in FIG. 1B, the pair of image display elements 5 and the pair of eyepiece lens 4 are arranged in a housing 6, and the angular displacement amount detection unit 2 is arranged inside or on the surface portion of a belt 7 serving as mounting means for mounting the housing on the head portion of the observer.

The belt 7 of this embodiment is constituted by a belt 7(a) that covers the back portion of the head portion of the observer, and a belt 7(b) that covers a portion between the forehead and the top of the head of the observer, thus improving holding performance.

Also, the angular displacement amount detection unit 2 comprises a unit (2a) arranged on the belt 7(b), units 2(c) (not shown) and 2(b) arranged on the belt 7(a) on the right and left side portions of the head, and a unit 2(d) arranged on the belt 7(a) on the back portion of the head.

With this arrangement, the observer can observe images on the image display elements 5 while wearing the housing 6 on his or her head portion 1, and can turn these members in the vertical and horizontal directions together with the head portion 1.

An electrical signal output from the angular displacement amount detection unit 2 is input to an angular displacement signal processing unit 8. As shown in FIG. 2, the angular displacement signal processing unit 8 comprises an amplifier 9 for amplifying the input signal from the angular displacement amount detection unit 2, a low-pass filter 10 for removing signal components (high-frequency components) due to a small vibration (e.g., shakes) of the head, and passing only a signal representing a large movement of the head portion 1 for image movement (i.e., cursor movement), and an A/D converter 11 for A/D-converting the signal output from the low-pass filter 10. A digital signal associated with the direction of the head portion 1 is output to a control unit 12.

The control unit 12 shown in FIG. 1A has image position control means for calculating the moving position of an image on the display surface, and also has a function of converting an image signal including a cursor input from a computer 13 into an image signal that can drive the image display elements 5. The computer 13 synthesizes a moving image and the cursor, which is always fixedly displayed at the center (the intersection of the diagonal lines of the display screen) of each image display element 5, on the basis of the calculation result of the image display position from the control unit 12, and transmits the composite image signal to the control unit 12.

In the control unit 12, image position control means (not shown) receives the digital signal which is output from the angular displacement signal processing unit 8 and indicates the angular displacement, and calculates the display position of an image with respect to the cursor on the display surface of each image display element 5. In addition, the image position control means calculates the display position, so that the moving direction of an image to be observed by the observer on the display surface of each image display element 5 is opposite to the pivot direction of the head portion 1.

Calculation control performed by the image position control means in association with movement of an image to the desired position upon angular displacement of the head portion 1 will be explained below with reference to FIG. 3.

Referring to FIG. 3, solid lines indicate the positions of the head portion 1, the eyepiece lens 4, and the image display element 5 before the observer turns his or her head portion 1, and alternate long and two short dashed lines indicate the positions of the head portion 1, the eyepiece lens 4, and the image display element 5 when the observer turns his or her head portion 1, and an image moves to a desired position on the display surface to change the positional relationship with a cursor K fixed at the central portion of the image display element 5.

Furthermore, the image display elements 5, the cursor K on the display surface, and the image are projected as an aerial image (virtual monitor) which is observed by the user in an enlarged scale via the eyepiece lenses 4. In this case, if an arbitrary image point on the image is represented by P, an image display element (virtual monitor) 5', a cursor K', and an arbitrary image point P' are simultaneously displayed.

In FIG. 3, if the direction of the head portion 1 with reference to a virtual axis L1 of the head portion 1 fixed in a space before the observer turns his or her head portion 1 is represented by an angle, θ1 and direction after the observer turns his or her head portion 1 is represented by an angle θ2, the displacement amount, Δθ, of the direction of the head portion 1 is given by:

$$\Delta\theta = \theta 2 - \theta 1 \qquad (1)$$

Similarly, if the azimuth angle (from the eyeball 3b) of the arbitrary image point P' on the screen with reference to a virtual axis L2 of the fixed cursor K on the extended line of the optical axis of the eyepiece lens 4 before the observer turns his or her head portion 1 is represented by an angle α1, and the azimuth angle of the image point P' after the observer turns his or her head portion 1 is represented by an angle α2, the change amount, Δα, of the azimuth angle of the image point is given by:

$$\Delta\alpha = \alpha 2 - \alpha 1 \qquad (2)$$

At this time, the ratio, K, between the absolute value of the displacement amount Δα of the angular displacement of the head portion 1 and the absolute value of the change amount of the azimuth angle of the image is given by:

$$K = |\Delta\alpha|/|\Delta\theta| \qquad (3)$$

The value K may be arbitrarily determined in correspondence with the use mode. In this embodiment, K=1, so that the change amount Δα of the azimuth angle of the image position has the same absolute value as but an opposite direction to those of the angular displacement amount Δθ of the head portion 1 of the observer. For this reason, when the observer observes the image display element 5', he or she feels as if the image stood still. The observer can naturally move the cursor K' integrally coupled to his or her head portion 1 with respect to an image which stands still in a space by moving his or her head portion 1, and can superpose the cursor K' at a desired position.

The moving amount, ΔD, of the image on the display surface at that time can be set as follows based on the paraxial calculation of the eyepiece optical system:

$$|\Delta D| = F \cdot |\Delta\alpha| = F \cdot |\Delta\theta| \qquad (4)$$

where F is the focal length of the eyepiece lens 4.

This calculation result is output from the control unit 12 to the computer 13, and is used in image generation performed by the computer 13, as described above.

In order to set the moving direction of the image in a direction opposite to the moving direction of the head portion 1, the sign of ΔD can be inverted.

As shown in FIG. 1A, first and second switches 14 and 15 are connected to the control unit 12. When the first switch 14 is turned on, the control unit 12 outputs a signal for clearing the angular displacement amount to 0 to the angular displacement signal processing unit 8, and enables the image position control means.

The angular displacement amount is cleared to 0 for the purpose of calculating the subsequent angular displacement amount Δθ of the head portion 1 with reference to the direction of the head portion 1 at the ON timing of the first switch 14, and performing image movement. When the first switch 14 is turned off, the control unit 12 fixes the image in position on the display surface at that time.

When the second switch 15 is clicked, the control unit 12 outputs a signal indicating that the image position, i.e., the cursor position on the image is determined to the computer 13.

Therefore, for example, when the cursor position is adjusted to a desired icon position on an image and the second switch 15 is clicked, the icon is selected.

The first and second switches 14 and 15 may be stored in the housing 6. However, in this embodiment, these switches are arranged independently of the housing 6 so that the observer can visually confirm these switches via a window 16 and can operate them with his or her finger.

The window may comprise various types of windows such as a plastic window, a colored window serving as sunglasses that decrease the transmittance, a liquid crystal shutter that arbitrarily changes the transmittance, and the like.

A third switch 21 comprises a joystick, and is used for moving the cursor to an easy-to-see position for the observer when the cursor displayed on the display surface of each image display element 5 is not easy to use at the current position.

When the stick of the third switch 21 is operated in the vertical and horizontal directions, a signal for moving the cursor on the display surface in the vertical and horizontal directions is generated. This signal is supplied to the control unit 12.

The control unit 12 displays the cursor at the position determined by the third switch. The display position of the cursor is changed all the time during the operation of the third switch. When the observer stops the operation of the third switch at his or her easy-to-see position, i.e., when the joystick returns to its neutral position, the cursor is fixed on the display surface in response to this signal.

The third switch 21 serves as both input position indication mark moving means and input position indication mark fixing means.

For this reason, when the observer feels that the cursor located at a desired offset position is easy to see rather than one at the center of the display screen in an initial state, he or she can desirably move and adjust the cursor with respect to the display surface to an easy-to-see position.

This embodiment has the above-mentioned arrangement, and the operation of this embodiment will be described below.

The observer wears the housing 6 on his or her head portion 1 using the belt 7, and observes an image superposed with the cursor on the image display elements 5 in an enlarged scale via the eyepiece lenses 4.

If the observer feels that the cursor is located at an easy-to-see position for him or her, he or she need not operate the third switch 21. However, when the observer feels that the cursor position is unnatural for him or her, he or she operates the third switch 21 to move the cursor to an easy-to-see position.

When the observer wants to move the cursor on the image from the current position to another target position, i.e., a position on a given icon, he or she turns on the first switch 14. In this case, the control unit 12 outputs a signal to the angular displacement signal processing unit 8 to clear the angular displacement amount to 0.

When the observer turns his or her head portion 1, the angular displacement amount detection unit 2 attached to the head portion 1 detects the pivot direction and angle of the head portion 1, and inputs them to the angular displacement signal processing unit 8, thus measuring the angular displacement amount.

In the angular displacement signal processing unit 8, a digital signal from which high-frequency noise components are removed by the low-pass filter 10, and which indicates the angular displacement of the head portion 1 is input to the image position control means of the control unit 12.

The image position control means calculates the image moving amount ΔD from the current position to the desired position on the basis of equation (4). The calculation result is output to the computer 13 as a signal indicating the image position, and is re-input to the control unit 12 after it is superposed on a cursor signal.

The signal is converted, and the converted signal is input to the image display elements 5, thus displaying an image which moves to the desired position, together with the cursor.

At this time, in the system of this embodiment, since the image display elements 5 are pivoted integrally with the head portion, the observer can always observe the cursor in front of him or her (the cursor position can be corrected to an easy-to-see position for the observer when the third switch 21 is operated), and feels as if he or she were moving the cursor to a position in front of his or her face.

Since the image moves by the same amount as the moving amount of the head portion 1 in a direction opposite to the moving direction of the head portion 1, it appears to the observer that the cursor moves relative to the image fixed in a space in correspondence with the movement of the head portion, and the cursor that moves to a desired position on the image can be naturally observed in the sense of the observer.

When the first switch 14 is turned off in a state wherein the cursor is moved to the desired position with respect to the screen, i.e., on the position on an icon to be selected, the cursor no longer moves in the image independently of the movement of the head portion 1. More specifically, the cursor is fixed and held on the image. Subsequently, when the second switch 15 is clicked, the icon can be selected.

As described above, in this embodiment, since the image is observed in a still state relative to the movement of the head portion, and the cursor moves on the image in the still state upon movement of the head portion, the cursor is always located in the turning direction of the observer. For this reason, the observer can operate the cursor while naturally observing the image, thus suppressing eye fatigue of the observer accordingly.

Figure 5:
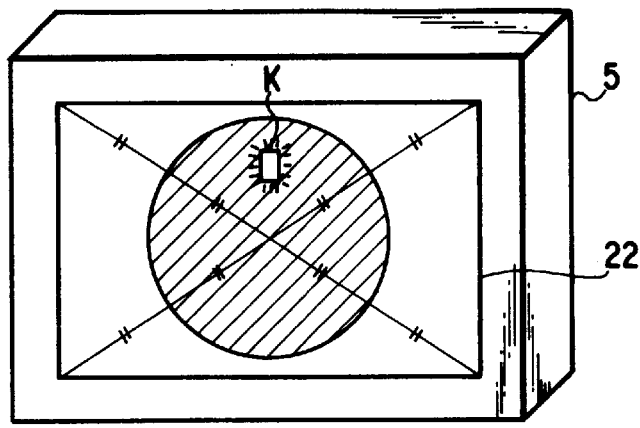
FIG. 5 is a view showing the display position range of a cursor.

A modification of this embodiment will be supplemented below. The position of the cursor in the initial state is not limited to the above-mentioned position. The cursor position need only fall within the range which has the intersection of the diagonal lines of a display surface 22 as the center, and has a radius ¼ the diagonal line length, as indicated by a hatched portion in FIG. 5. Preferably, the cursor position falls within the range having a radius ⅙ the diagonal line length.

This will be described below.

A variety of head mounting type image display systems are available and range from an apparatus having a large field angle for virtual reality to a low-end apparatus having a small field angle. The head mounting type image display system of the present invention for use in offices preferably has a field angle falling within the range of 30° to 40° in the horizontal direction. For example, assume that the field angle in the horizontal direction is 33° and the field angle in the vertical direction is 22°. When the cursor has the radius ¼ the diagonal line length, as described above, a display is performed within a circular visual field range of about 10° in the four directions from the observer's eyeballs. This range matches a region called an effective visual field in which information can be searched within the range of natural eyeball movements. The fatigue of the observer's eyeballs can be minimized even in long-time use of the apparatus.

When the cursor has the radius ⅙ the diagonal line length, a display is performed within a circular visual field range of about 6.5° from the observer's eyeballs. This range almost matches a region called a discrimination visual field in which observer's eyeballs are excellent in viewing functions such as visual power and color discrimination and high-precision information reception is allowed. The fatigue of the observer's eyeballs can further be reduced in long-time use of the apparatus. Although the discrimination visual field is described to fall within the range of about 5° from the center, the above range is preferable in consideration of the shift of the center caused by the shift in mounting the apparatus.

In the above embodiment, the cursor is fixed in position upon movement of the image. Alternatively, the cursor position need not be fixed as long as the cursor movement does not influence the observation. After the cursor position is determined, it need only be preferably falls within the range which has the determined position as the center and has a radius ¼ the diagonal line length. Preferably, the cursor position falls within the range having a radius ⅙ the diagonal line length.

In this case, the image signal converted by the control unit 12 and the computer 13, which serve as image conversion means, is preferably set to be an image signal which moves the cursor as an input position indication mark on the display surface 22 upon operation of the angular displacement amount detection unit 2 as an operation device, and scrolls an image in a direction opposite to the moving direction of the cursor.

FIGS. 9A, 9B, and 9C are views for explaining this modification.

FIG. 9A shows a state before image movement. On the display surface 22, a plurality of icon portions 24 and a cursor K are displayed. In this state, when the observer moves his or her head portion to adjust the position of the cursor K to the position of an upper left icon portion 24 "A", if the cursor K is fixed at the center of the display surface, a state shown in FIG. 9B is obtained, and a portion where the image signal does not represent the display surface is omitted, as indicated by a hatched portion, thus reducing information to be displayed.

In order to prevent this problem, when the image and the cursor are moved in nearly opposite directions, as described above, a state shown in FIG. 9C is obtained, and the omission amount can be reduced. In addition, the moving amount of the eyeball can be smaller than in an arrangement in which an image (icon portion) is fixed in position on the display screen.

For example, a case will be examined wherein the cursor is moved upward by a moving distance L with respect to an image. In this case, various changes may be made. For example, the image position control means may convert an image signal into one for moving the image downward by 0.7L with respect to the display surface and moving the cursor upward by 0.3L, and may transmit the converted signal to the display elements 5. Alternatively, the image position control means may convert an image signal into one for moving the image downward by 0.5L with respect to the display surface and moving the cursor upward by 0.5L, and may transmit the converted signal to the display elements 5.

The second embodiment of the present invention will be described below with reference to FIGS. 4A and 4B.

In the first embodiment, the face direction detector such as a gyro is used as the operation device. However, in the second embodiment, a keyboard and a mouse is used as the operation device. The same reference numerals in the second embodiment denote the same parts as in the first embodiment, and a detailed description thereof will be omitted.

Figure 4A:
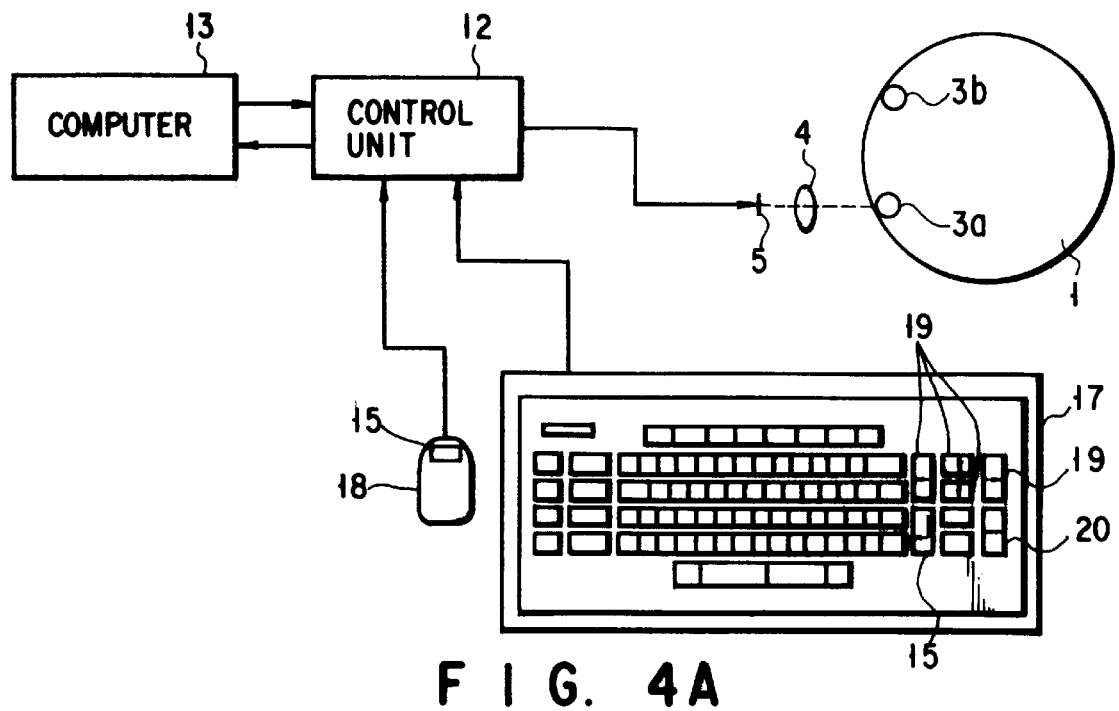
FIGS. 4A and 4B are schematic views showing the second embodiment of the present invention.
Figure 4B:
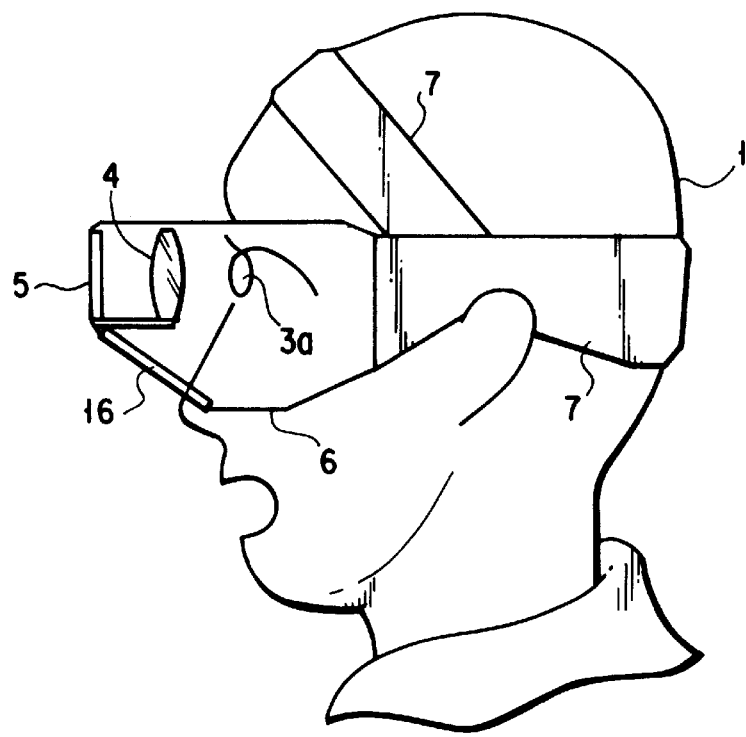

FIG. 4A is a schematic view of the present invention, and FIG. 4B shows the layout of an image display element and an eyepiece optical system when an observer wears a head mounting type image display system.

Referring to FIGS. 4A and 4B, a keyboard 17 and a mouse 18 are arranged independently of the head mounting type image display system main body shown in FIG. 4B so that the operator himself or herself can manually operate them. The input signal from the keyboard 17, the moving signal of the mouse 18, and the input signal generated upon clicking the mouse 18 are output to a control unit 12.

The control unit 12 shown in FIG. 4A has image position control means for calculating the moving position of an image on the display surface, and also has a function of converting an image signal including a cursor input from a computer 13 into an image signal that can drive image display elements 5.

The computer 13 synthesizes an image and the cursor, which is always fixedly displayed at the center of each image display element 5, on the basis of the calculation result of the image display position from the control unit 12, and transmits the composite image signal to the control unit 12.

In the control unit 12, the image position control means (not shown) receives an image movement instruction signal (the above-mentioned input signal and moving signal) output from the keyboard 17 and the mouse 18, and calculates the display position of the image with respect to the cursor on the display surface of each image display element 5.

The calculation method of image movement by the image position control means will be described below.

When a key operation for instructing a display of a character, symbol, numeral, or the like as an image is made at the keyboard, an image signal is converted into a signal for moving the image by a distance corresponding to the number of input characters.

In this case, when a normal display method for displaying characters and the like in line from the left to the right on the screen is adopted, the image on each display element is preferably moved to the left side to move a projected virtual image to the left side in correspondence with the input operation. This embodiment adopts this method.

When a cursor movement operation is performed by operating cursor keys 19, an image signal is converted into a signal for moving the image by an instructed amount (the number of times of depressions and/or depression time) in a direction opposite to the instruction direction of the cursor movement.

Also, in response to an operation of a line return operation, page break operation, page designation operation, or the like (not shown), an image signal is converted into a signal for scrolling the image in correspondence with the position of the cursor fixed on the display surface.

When the movement operation of the mouse 18 is performed, an image signal is converted into a signal for moving the image by the moving amount of the mouse in a direction opposite to the movement operation direction (the side where a switch 15 which is clicked by the finger tip and outputs a signal for determining the cursor position is located is assumed to be the upward direction).

At this time, a method of performing image movement in proportion to the moving distance of the mouse 18, or a method of performing image movement while setting the moving speed in association with the moving amount of an image is available.

The keyboard 17 has a switch key 20 for transmitting a signal for switching the moving direction of the image between the same and opposite directions as and to the movement operation direction of the mouse 18.

When the switch key 20 is in the ON state, if the movement operation of the mouse 18 is performed, an image signal is converted into a signal for moving the image by the moving amount of the mouse in the same direction as the movement operation direction.

The second embodiment has the above-mentioned arrangement, and its operation will be explained below.

When the observer performs an input operation of characters and the like by key operations of the keyboard 17, each character is input at the position on the cursor, which is displayed just in front of the observer and is fixed in position.

At this time, when three letters "HMD" are displayed by key inputs, an image is scrolled to the left by three letters, and the fixed cursor is located at the right neighboring position of the three letters "HMD".

When the input operation is performed up to the right end on the screen, the screen is automatically scrolled upward by one line, so that the fixed cursor is located at the left end of the screen.

For this reason, since the cursor is always located just in front of the observer, the observer can perform an input operation even at the end of a moving image without moving his or her eyeballs in the vertical and horizontal directions.

When the observer wants to move the cursor on a moving image from the current position to another target position by operating the mouse 18 or the cursor keys 19, if he or she moves the mouse 18 to the left while the switch key is in the OFF state, the image moves to the right accordingly.

When the left arrow key of the cursor keys 19 is operated, the image moves to the right in correspondence with this operation. For this reason, since the cursor is always located just in front of the observer, the observer can perform an input operation even at the end of a moving image without moving his or her eyeballs in the vertical and horizontal directions.

At this time, the observer feels as if he or she were moving the cursor itself using the mouse 18 or the cursor keys 19.

On the other hand, upon operation of the mouse 18 while the switch key 20 is in the ON state, when the mouse 18 is moved to, e.g., the left, the image moves to the left in correspondence with this operation.

In other words, the holding feeling of the mouse 18 matches the holding feeling of an image, and the observer feels as if he or she were moving the image in the vertical and horizontal direction with his or her own hand. In this case, since the image is actually moved, a practical operation can be attained, and the observer does not suffer seasickness even in a long time of use.

As described above, according to the second embodiment, since a key operation and a mouse operation which are convenient to use can be performed while reducing the weight of the system main body and fixing the cursor at the center of the screen, the eyeball movement of the observer can be suppressed, and the observer does not experience fatigue even in a long time of use.

Of course, the mouse may be replaced by various other input position conversion operation devices such as a joystick, a tracing ball, a light pen, an electronic blackboard, a head mounting type cursor operation device independent from the main body, and the like.

As can be seen from the above description, in the first and second embodiments, since the cursor is always located in front of the observer's face, when the pixel density in the vicinity of the cursor on the virtual image is set to be higher than that at the peripheral portion of the virtual image, a portion in the vicinity of the cursor, which is gazed most frequently, always has a high resolution independently of an operation. For this reason, such an arrangement is very effective for the head mounting type image display system whose display element has a limited size.

As a concrete arrangement, a method of displaying a barrel-distorted image on an image display element 5, and observing the displayed image via an eyepiece optical system 4 that generates a pincushion distortion, as shown in FIG. 8, so as to increase the pixel density of the central portion of a virtual image 5; when images (A, B, and C in FIG. 8) are moved in the directions of arrows in FIG. 8 while being distorted by a computer, they are moved on the virtual image while being aligned in the vertical and horizontal directions. Furthermore, in this case, a method of setting pixels of the central portion of the display element itself at a high density, or the like may be adopted.

If no problem is posed even in the presence of a slight distortion, a normal image may be displayed in a normal display element, and the observer may observe it with an optical system in which a pincushion distortion occurs.

Figure 6:
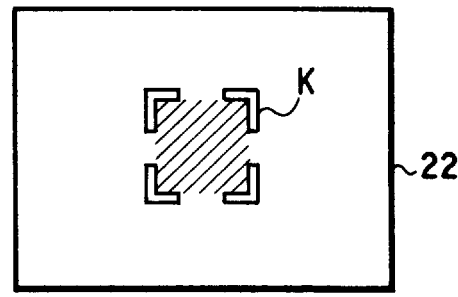
FIG. 6 is a view showing another example of the cursor.

The shape of the input position indication mark is not particularly limited, and various other marks may be used. For example, a rectangular cursor having a size for one 2-byte character may be used, or the input position indication mark may be defined by an indicatable arbitrary region (hatched portion in FIG. 6), as shown in FIG. 6.

In the above embodiments, the input position indication mark is displayed on the display surface on the basis of a signal. Alternatively, as shown in FIGS. 7A and 7B, the input position indication mark may be formed on the display surface or a transparent substrate arranged in the vicinity of the display surface, and may be located within a range separated by the distance ¼ or less the diagonal line length of the display surface from the intersection of the diagonal lines of the display surface, so that an image is scrolled upon an operation.

Figure 7A:
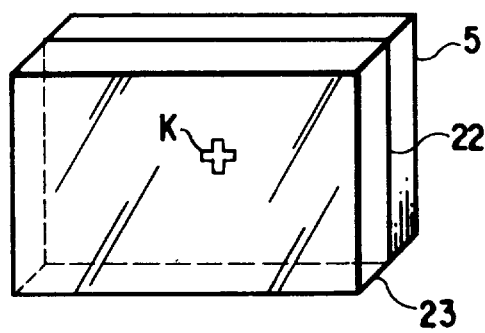
FIGS. 7A and 7B are views showing an example wherein the cursor is arranged on a transparent substrate.

FIG. 7A shows an example wherein a cross-shaped cursor is painted in advance on the rear surface of a transparent substrate 23 of the LCD 5 and at the center of the display surface 22.

Figure 7B:
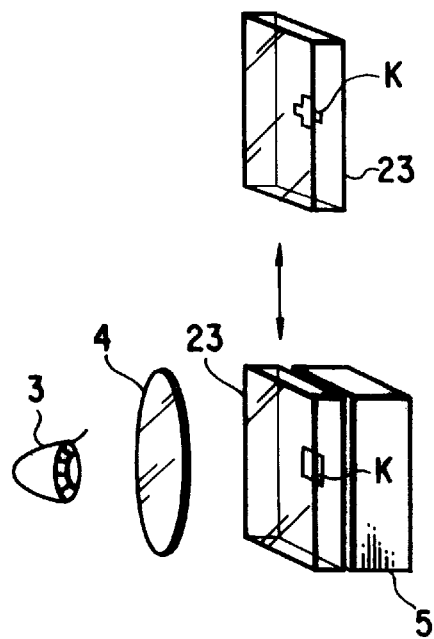
Figure 10:
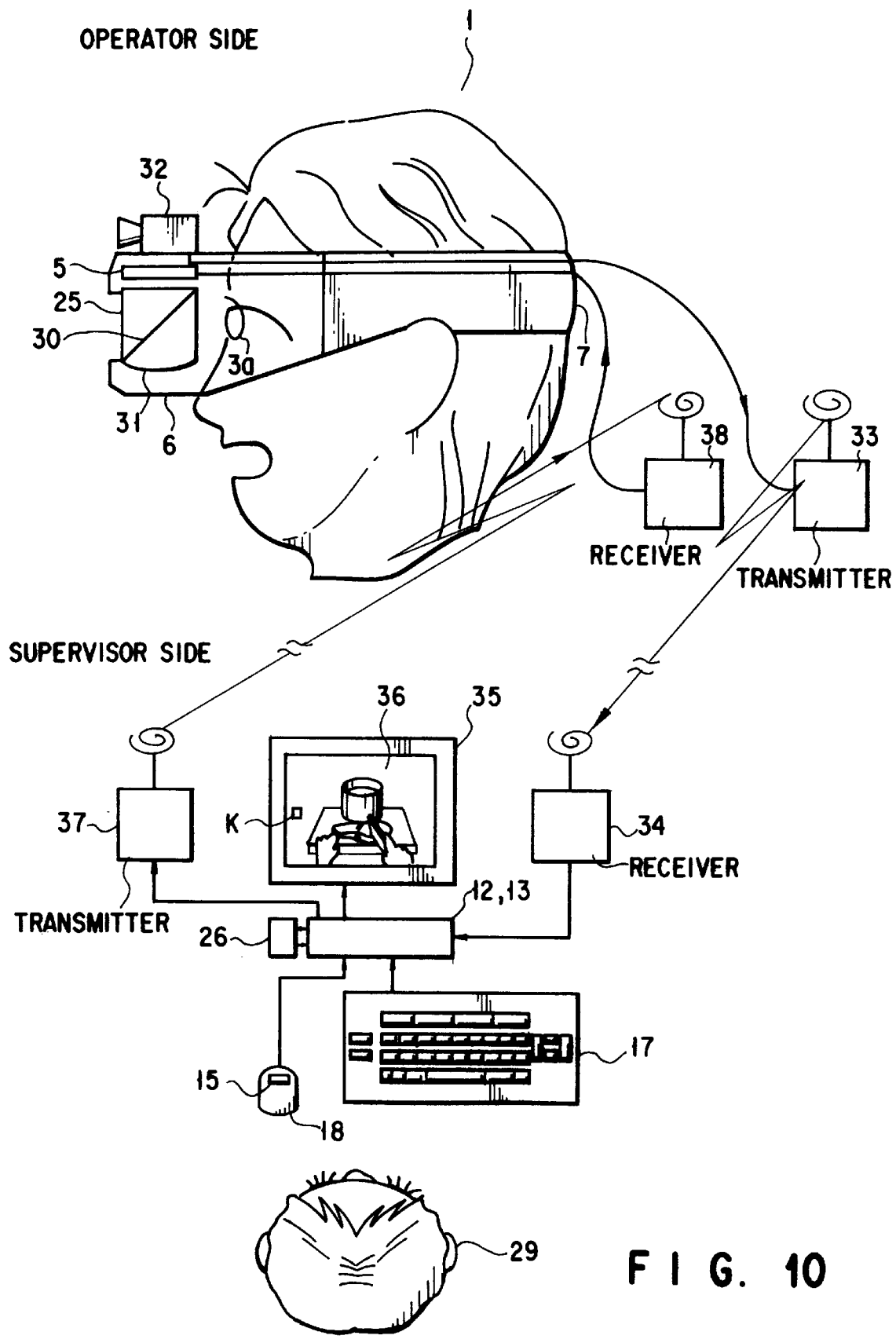

On the other hand, FIG. 7B shows an example wherein many different types of transparent substrates 23 are exchangeably arranged in the vicinity of the surface of the LCD 5 so that the observer can select a desired cursor shape. In this arrangement, the transparent substrate may be inserted or removed outside the head mounting type image display system main body, and may be detached if no cursor display is required.

With this arrangement, since the signal processing and display processing of the cursor can be omitted, a section for performing the signal processing can be simplified, and an inexpensive system can be provided.

The above-mentioned embodiments can add or omit each other's arrangements in correspondence with the scope of claims. The present invention is not limited to the above-mentioned embodiments, and various changes may be made within the scope of claims.

The third embodiment of the present invention will be described below.

FIG. 10 and FIGS. 11A to 11G show the arrangement and operation of the head mounting type image display system of this embodiment. The image display system comprises an LCD 5 as an image display element for displaying an image, a prism optical system 25 for guiding an image displayed on the LCD 5 onto an eyeball 3a of an observer, and mounting means 7 with which these components can be mounted on the head portion of the observer.

The image display system of this embodiment also comprises operation devices (a mouse 18 and a keyboard 17 in this embodiment), which are used for displaying and operating a cursor K (see FIG. 11F) on the image on the LCD 5.

Furthermore, the image display system comprises image conversion means (computers 12 and 13 also serving as a control unit), which transmits an image signal in which the relative positional relationship between an image 28 displayed on a display surface 22 of the LCD 5 and the cursor K has changed upon operation of the operation devices 18 and 17, to the LCD 5.

Also, the image display system comprises input data display range control means 26 which allows arbitrary selection of a desired region 27 on the display surface 22 of the LCD 5 upon movement of the cursor K and displays data 28 on only the selected desired region 27.

In this embodiment, the present invention is more preferably modified on the basis of the above-mentioned arrangement, so that an operator 1 wears the main body, and a supervisor 29 controls an image displayed on the system to instruct operation contents to the operator 1.

A half-mirror surface 30 is arranged in front of the operator (observer) 1, and light from the external field is transmitted through the half-mirror surface 30 and is guided onto the eyeball 3a of the operator. Light rays from the LCD 5 are transmitted through the half-mirror surface 30, are reflected by a concave reflection surface 31, are then reflected by the half-mirror surface 30, and are guided onto the eyeballs 3a of the operator.

As described above, since the half-mirror surface, which transmits external field light and reflects light rays from the image display element, is arranged in front of the eyeballs of the observer, the observer can simultaneously observe the external field and the displayed image as they are superposed on each other.

The head mounting type image display system main body has a fixed photographing camera 32 for photographing a scene in front of the operator (observer) 1. The photographing range of the photographing camera 32 roughly matches the observation field angle of the external field of the operator (observer) 1. The photographing range of the photographing camera 32 is preferably appropriately changed by, e.g., zooming upon movement of an optical system (not shown) in the photographing camera 32 since the field angle can be adjusted.

An image photographed by the photographing camera 32 is transmitted to the supervisor 29, who is in a remote location from the operator 1, using a transmitter 33, and the transmitted image is received by a receiver 34 on the supervisor side. The received image is subjected to signal processing via the computers 12 and 13 also serving as a control unit. The supervisor can observe the processed image using a display 35. The image displayed on the display 35 at this time is nothing but an external field image observed by the operator 1.

The display 35 on the supervisor side is coupled to the keyboard 17 and the mouse 18, which have been described in the second embodiment, via the computers 12 and 13 also serving as a control unit. With this arrangement, the supervisor 29 can issue an operation instruction using the keyboard 17 and the like while observing the operation state of the operator 1 displayed on the display 35.

The method will be described below with reference to FIGS. 11A to 11G. The supervisor 29 observes an image 36 of the external field observed by the operator 1. When the supervisor 29 notices an operation procedure error of the operator 1, he or she sets a display range 27' which shows the correct procedure by moving the mouse 18 (FIG. 11A), pushing a switch 15 (FIG. 11B), dragging the mouse 18 (FIG. 11C), and releasing the switch 15 (FIG. 11D). The input data display range control means 26 detects such operations, and sets the display input range. When the supervisor inputs an instruction text (data) using the keyboard 17, instruction text (data) 28 is displayed within the set range, as shown in FIG. 11E. The displayed instruction text 28 is transmitted from a transmitter 37 on the supervisor side, and is received by a receiver 38 arranged on the head mounting type image display system main body on the operator side. As shown in FIG. 11F, the instruction text 28 is displayed in the predetermined region 27 on the display surface 22 of the LCD 5. FIG. 11G shows the state of a synthesized image of the external field image and the displayed image observed by the operator 1.

As described above, the supervisor can select a display position that does not disturb the operation of the operator as a region, and can transmit an instruction text (graphics in some cases) to the selected region.

A voice instruction may be transmitted. However, the voice instruction is not suitable for a case wherein complicated information such as computer graphics is to be notified. When the system is used in a noisy place such as a factory, it is difficult to notify a voice instruction. However, according to the present invention, since visual information can be presented, an instruction can be adequately issued.

As a modification of this embodiment, in place of using a transparent window used for superposing external field light on a displayed image, an image photographed by the photographing camera 32 may be displayed on the LCD 5 to present the state of the external field to the operator. In this case, the image displayed on the LCD 5 is the same as that displayed on the display 35 as the second image display element.

This processing can be performed by the computers 12 and 13 also serving as a control unit, and a synthesized image can be transmitted to the LCD 5 using the transmitter 37 on the supervisor side. With this processing, as shown in FIG. 12, an image and the cursor K are displayed on the LCD 5, and the operator can perform an operation based on the displayed image.

As can be seen from the above description, according to the present invention, a head mounting type image display system that can reduce eye fatigue of the observer even in an input operation of the observer can be prevented.

Furthermore, a head mounting type image display system that can easily adjust the position of the input position indication mark by changing only the direction of his or her face can be provided.

Furthermore, a head mounting type image display system which can attain a weight reduction of the head mounting type image display system main body can be provided.

Furthermore, a head mounting type image display system suitable for a keyboard input can be provided.

Furthermore, a head mounting type image display system, which is suitable for mark movement attained by an operation device for moving the input position indication mark relative to the screen in the horizontal and vertical directions, can be provided.

Furthermore, a head mounting type image display system suitable for input movement attained by a mouse can be provided.

Furthermore, a head mounting type image display system which can facilitate image processing and allows an observer to easily see the input position indication mark can be provided.

Furthermore, a head mounting type image display system which allows an input operation while visually observing the input operation unit and the like can be provided.

Furthermore, a head mounting type image display system which effectively utilizes pixels of the image display element and can set the gazed portion at a high resolution can be provided.

In addition, specific effects described in the present specification can be obtained.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A head mounting type image display system comprising:
   a head mounting type image display system main body having:
   a) an image display element for displaying an image,
   b) an eyepiece optical system for guiding the image displayed on said image display element to an eyeball of an observer, and
   c) mounting means for allowing said image display element and said eyepiece optical system to be mounted on a head portion of the observer;
   an operation device for displaying an input position indication mark on the image, and operating the input position indication mark; and
   image conversion means for transmitting, to said image display element, an image signal in which a relative positional relationship between the image and the input position indication mark displayed on a display surface of said image display element has changed upon operation of said operation device, wherein the image signal converted by said image conversion means has a function of forming the input position indication mark to be movable within a circular range which has a radius not more than ¼ a diagonal line length from an intersection of diagonal lines of the display surface and a function of scrolling the image as a background image with respect to the input position indication mark, both upon operation of said operation device.

2. A head mounting type image display system comprising:
 a head mounting type image display system main body having:
  a) an image display element for displaying an image,
  b) an eyepiece optical system for guiding the image displayed on said image display element to an eyeball of an observer, and
  c) mounting means for allowing said image display element and said eyepiece optical system to be mounted on a head portion of the observer;
 an operation device for displaying an input position indication mark on the image, and operating the input position indication mark; and
 image conversion means for transmitting, to said image display element, an image signal in which a relative positional relationship between the image and the input position indication mark displayed on a display surface of said image display element has changed upon operation of said operation device,
 wherein the image signal converted by said image conversion means has a function of forming the input position indication mark to be fixed in position within a circular range which has a radius not more than ¼ a diagonal line length from an intersection of diagonal lines of the display surface and a function of scrolling the image as a background image with respect to the input position indication mark, both upon operation of said operation device.

3. A head mounting type image display system comprising:
 a head mounting type image display system main body having:
  a) an image display element for displaying an image,
  b) an eyepiece optical system for guiding the image displayed on said image display element to an eyeball of an observer, and
  c) mounting means for allowing said image display element and said eyepiece optical system to be mounted on a head portion of the observer;
 an operation device for displaying an input position indication mark on the image, and operating the input position indication mark; and
 image conversion means for transmitting, to said image display element, an image signal in which a relative positional relationship between the image and the input position indication mark displayed on a display surface of said image display element has changed upon operation of said operation device,
 wherein said operation device comprises:
  input position indication mark moving means for moving a display position of the input position indication mark with respect to the display surface in correspondence with an operation of the observer; and
  input position indication mark fixing means for fixing the input position indication mark at the display position of the input position indication mark which is changed by said input position indication mark moving means, and
 the image signal converted by said image conversion means has a function of forming the input position indication mark to be fixed in position within a circular range which has a radius not more than ¼ a diagonal line length from the changed display position and a function of scrolling the image as a background image with respect to the input position indication mark, both upon operation of said operation device.

4. A head mounting type image display system comprising:
 a head mounting type image display system main body having:
  a) an image display element for displaying an image,
  b) an eyepiece optical system for guiding the image displayed on said image display element to an eyeball of an observer, and
  c) mounting means for allowing said image display element and said eyepiece optical system to be mounted on a head portion of the observer;
 an operation device for displaying an input position indication mark on the image, and operating the input position indication mark; and
 image conversion means for transmitting, to said image display element, an image signal in which a relative positional relationship between the image and the input position indication mark displayed on a display surface of said image display element has changed upon operation of said operation device,
 wherein the input position indication mark is arranged on the display surface or a transparent substrate arranged in the vicinity of the display surface, and is located within a circular range which has a radius not more than ¼ a diagonal line length from an intersection of the diagonal lines of the display surface, and
 the image signal converted by said image conversion means has a function of scrolling the image as a background image in correspondence with the input position indication mark upon operation of said operation device.

5. A head mounting type image display system comprising:
 a head mounting type image display system main body having:
  a) an image display element for displaying an image,
  b) an eyepiece optical system for guiding the image displayed on said image display element to an eyeball of an observer, and
  c) mounting means for allowing said image display element and said eyepiece optical system to be mounted on a head portion of the observer;
 an operation device for displaying an input position indication mark on the image, and operating the input position indication mark; and
 image conversion means for transmitting, to said image display element, an image signal in which a relative positional relationship between the image and the input position indication mark displayed on a display surface of said image display element has changed upon operation of said operation device; wherein the image signal converted by said image conversion means is an image signal for moving the input position indication mark on the display surface and scrolling the image as a background image in a direction opposite to the moving direction of the input position indication mark with respect to the input position indication mark, both upon operation of said operation device; and wherein the image signal converted by said image conversion means locates the input position indication mark within a range separated by a distance not more than ¼ a diagonal line length from an intersection between diagonal lines of the display surface upon operation of said operation device.

6. A system according to any one of the claims 1, 2, 3, 5, 13 wherein said operation device comprises a face direction detector which is arranged integrally with said head mounting type image display system main body, and can detect a displacement of a direction of a face of the observer, and the image signal converted by said image conversion means has a function of scrolling the image as a background image with respect to the input position indication mark so as to scroll the image in a direction opposite to the direction of the displacement of the direction of the face detected by said face direction detector, both upon detection of the displacement of the direction of the face by said face direction detector.

7. A system according to claim 1, wherein said operation device is arranged independently of said head mounting type image display system main body.

8. A system according to claim 7, wherein said operation device comprises a keyboard, and the image signal converted by said image conversion means is an image signal for scrolling the image to a left side in cooperation with an input operation at said keyboard.

9. A system according to claim 7, wherein said operation device comprises an input position conversion operation device which can instruct a two-dimensional conversion of the relative positional relationship of the image and the input position indication mark displayed on the display surface of said image display element, and the image signal converted by said image conversion means is an image signal for scrolling the image in correspondence with an operation direction and/or a position of said input position conversion operation device.

10. A system according to claim 9, wherein said input position conversion operation device comprises a mouse, and the image signal converted by said image conversion means is an image signal for scrolling the image in correspondence with an operation direction of said mouse.

11. A system according to any one of the claims 1, 2, 3, 5, 13, wherein said head mounting type image display system main body further has a window which allows the observer to visually confirm an external field.

12. A system according to claim 1, wherein a pixel density in the vicinity of the input position indication mark on a virtual image is higher than a pixel density at an end portion of the image.

13. A head mounting type of image display system comprising:

a head mounting type of image display system main body having:

a) an image display element for displaying an image, b) an eyepiece optical system for guiding the image displayed on said image display element in response to an eyeball position of an observer, and c) mounting means for enabling said image display element and said eyepiece optical system being adapted to be mounted on a head of the observer;

an operation device for displaying an input position indication mark on the image, and for operating the input position indication mark; and image conversion means for transmitting, to said image display element, an image signal in which a relative positional relationship between the image and the input position indication mark displayed on a display surface of said image display element has changed in response to an operation of said operation device, wherein the image signal converted by said image conversion means limits a location of said input position indication mark to a circular range having a radius which is not more than ¼ a diagonal line length from an intersection of diagonal lines of the display surface.

14. A system according to claim 6, wherein the amount of the displacement of a direction of a position of the image is equal to the amount of the displacement of the direction of the face of the observer.

* * * * *